(12) United States Patent
Allen (10) Patent No.: US 9,957,070 B2
(45) Date of Patent: May 1, 2018

(54) APPARATUS FOR SUPPLYING MULTIPLE FOAM MACHINES WITH FOAM PRECURSORS

(71) Applicant: Storopack, Inc., Cincinnati, OH (US)

(72) Inventor: Kurt William Allen, Lebanon, OH (US)

(73) Assignee: Storopack, Inc., Cincinnati, OH (US)

( * ) Notice: Subject to any disclaimer, the term of this patent is extended or adjusted under 35 U.S.C. 154(b) by 0 days. days.

(21) Appl. No.: 15/689,577

(22) Filed: Aug. 29, 2017

(65) Prior Publication Data

US 2017/0355475 A1    Dec. 14, 2017

Related U.S. Application Data

(62) Division of application No. 14/329,544, filed on Jul. 11, 2014, now Pat. No. 9,745,086.

(51) Int. Cl.
| | |
|---|---|
| *B65B 3/04* | (2006.01) |
| *B29C 44/46* | (2006.01) |
| *B29C 44/18* | (2006.01) |
| *B29L 31/00* | (2006.01) |
| *B29K 75/00* | (2006.01) |
| *B29B 7/74* | (2006.01) |

(52) U.S. Cl.
CPC .............. *B65B 3/04* (2013.01); *B29C 44/182* (2013.01); *B29C 44/461* (2013.01); *B29B 7/7433* (2013.01); *B29K 2075/00* (2013.01); *B29L 2031/712* (2013.01)

(58) Field of Classification Search
CPC ....... B65B 3/04; B29C 44/182; B29C 44/461; B29B 7/7615; B29B 7/7626
See application file for complete search history.

(56) References Cited

U.S. PATENT DOCUMENTS

| | | | |
|---|---|---|---|
| 3,481,455 | A | 12/1969 | Graham et al. |
| 3,667,499 | A | 6/1972 | Branton et al. |
| 4,150,074 | A | 4/1979 | Tilgner |
| 4,156,041 | A | 5/1979 | Gilbert |
| 4,390,337 | A | 6/1983 | Gately |

(Continued)

FOREIGN PATENT DOCUMENTS

| | | |
|---|---|---|
| EP | 1033230 A1 | 9/2000 |
| GB | 878368 | 9/1961 |

OTHER PUBLICATIONS

European Search Report, corresponding EP Application No. 15172671.8-1703, dated Dec. 18, 2015, 10 pages.

*Primary Examiner* — Timothy L Maust
*Assistant Examiner* — Timothy P Kelly
(74) *Attorney, Agent, or Firm* — Wood Herron & Evans LLP (57) ABSTRACT

Apparatus for supplying multiple foam machines with foam precursor chemicals. The apparatus comprises first and second totes having a top opening and a bottom drain and containing first and second foam precursor chemicals, first and second supply lines connected to the bottom drains of the first and second totes and in fluid communication with first and second sets of batcher stands, and first and second sets of batcher pumps each of which is positioned in a respective one of the first and second sets of batcher stands. Each batcher pump is adapted to be in fluid communication with a respective one of the foam machines.

1 Claim, 7 Drawing Sheets

(56) References Cited

U.S. PATENT DOCUMENTS

| | | | |
|---|---|---|---|
| 4,426,348 | A | 1/1984 | Salisbury |
| 4,800,708 | A | 1/1989 | Sperry |
| 4,898,327 | A | 2/1990 | Sperry et al. |
| 4,999,975 | A | 3/1991 | Wilden et al. |
| 5,376,219 | A | 12/1994 | Sperry et al. |
| 5,791,522 | A | 8/1998 | Lee et al. |
| 5,794,406 | A | 8/1998 | Reichental et al. |
| 5,964,378 | A | 10/1999 | Sperry et al. |
| 6,148,838 | A | 11/2000 | Tsay et al. |
| 6,502,721 | B2 | 1/2003 | Redman et al. |
| 6,862,868 | B2 | 3/2005 | Sperry et al. |
| 8,613,377 | B2 | 12/2013 | McGuffey et al. |
| 9,745,086 | B2 * | 8/2017 | Allen .................. B65B 3/04 |
| 2006/0096210 | A1 | 5/2006 | Placuzzi |
| 2010/0230032 | A1 | 9/2010 | Allen et al. |
| 2010/0230439 | A1 | 9/2010 | Wootton |
| 2012/0261028 | A1 | 10/2012 | Gray et al. |
| 2013/0047552 | A1 | 2/2013 | Cocciadieferro |
| 2013/0119152 | A1 | 5/2013 | Wishneski |

\* cited by examiner

APPARATUS FOR SUPPLYING MULTIPLE FOAM MACHINES WITH FOAM PRECURSORS

RELATED APPLICATIONS

This application is a divisional of U.S. patent application Ser. No. 14/329,544 filed Jul. 11, 2014, which is hereby incorporated by reference herein as if fully set forth in its entirety.

FIELD OF THE INVENTION

This invention relates generally to foam machines, and more particularly to apparatus for supplying foam machines with foam precursors.

BACKGROUND OF THE INVENTION

It is known to use plastic film sheet encased foam cushions as protective packaging for items to be shipped. One type of foam machine for making plastic film sheet encased foam cushions is known as a "foam-in-bag" machine. A foam-in-bag machine dispenses two foam precursors (reactive foam components) between two plastic film sheets as the sheets are advanced through the machine. The dispenser can be either the type that mixes the precursors internal to the dispenser, or the type that mixes the precursors external to the dispenser between the sheets. The mixed foam precursors begin expanding into foam. The sheets are sealed together at their edges by the machine and cut to a desired length by the machine. The cushion is then placed in a box between a wall or walls, e.g. side wall, top wall, bottom wall, etc., of the box, and the item shipped in the box, and the box is then closed. The mixed foam precursors continue to expand between the film sheets filling the void between the walls of the box and the item with foam thereby cushioning the item during shipment. One example of a foam-in-bag machine is the FOAMplus® BAGPACKER commercially available from the assignee of the present invention. Another example of a foam-in-bag machine is shown in US Patent Publication No. 2010/0230032, assigned to the assignee of the present invention, and hereby incorporated by reference herein as if fully set forth in its entirety.

Another type of foam machine for making plastic film sheet encased foam cushions is a handheld machine known as a "foam-in-place" machine. In a foam-in-place machine, a plastic film sheet is placed into the bottom of the box and a handheld gun is used to dispense the two foam precursors onto the sheet. The dispenser can be either the type that mixes the precursors internal to the dispenser, or the type that mixes the precursors external to the dispenser on the sheet. Once a sufficient quantity of foam precursors has been dispensed onto the sheet, the sheet is folded over onto the top of the fresh foam forming from the mixed precursors. The item to be shipped is then placed atop the sheet, and the expanding foam molds itself around the bottom and sides of the item. The process is repeated on the top of the item, and the box is then closed. The expanding foam molds itself around the top and sides of the item. One example of a foam-in-place machine is the FOAMplus® HANDPACKER commercially available from the assignee of the present invention.

The two foam precursor chemicals are typically supplied to the foam machines described above from one of two containers: 55 gallon drums or 275 gallon totes. Totes are preferred when supplying multiple machines to reduce the frequency of changing out drums. However, the tote has only a single top opening (known as a "bung") which can accommodate only a single pump (known as a "drum pump" or "batcher pump" or simply "batcher") for pumping the precursor to a given machine. Cutting additional holes in the top of the tote to accommodate multiple pumps would prevent the totes from being able to be returned and recycled. The typical solution is to construct a complicated and expensive system of piping and pumps.

Accordingly, a more effective means of delivering foam precursors to multiple foam machines is desired.

SUMMARY OF THE INVENTION

In one aspect, apparatus adapted to supply multiple foam machines with foam precursor chemicals is provided. The apparatus comprises a first tote having a top opening and a bottom drain and containing a first foam precursor chemical, a second tote having a top opening and a bottom drain and containing a second foam precursor chemical, a first supply line connected to the bottom drain of the first tote and in fluid communication with a first set of batcher stands, a second supply line connected to the bottom drain of the second tote and in fluid communication with a second set of batcher stands, a first set of batcher pumps each of which is positioned in a respective one of the first set of batcher stands, and a second set of batcher pumps each of which is positioned in a respective one of the second set of batcher stands. Each batcher pump of the first and second sets of batcher pumps is adapted to be in fluid communication with a respective one of the foam machines.

The batcher stands can be supported on the totes, or they can be free standing and positioned remote from the totes. The batcher stands can be upstanding cylindrical tubes. The batcher stands can be connected in series. Each batcher stand can have a valve to permit or prevent chemical from entering the batcher stand. The batcher stands of the first set of batcher stands can have a first common base, as can the batcher stands of the second set of batcher stands. The apparatus can further comprise first and second quick connect fittings connected between the drain ports of the first and second totes and the first and second supply lines, respectively.

In another aspect, apparatus for manufacturing foam cushions is provided. The apparatus comprises a first foam machine, at least a second foam machine, a first tote having a top opening and a bottom drain and containing a first foam precursor chemical, a second tote having a top opening and a bottom drain and containing a second foam precursor chemical, a first supply line connected to the bottom drain of the first tote and in fluid communication with a first set of batcher stands, a second supply line connected to the bottom drain of the second tote and in fluid communication with a second set of batcher stands, a first set of batcher pumps each of which is positioned in a respective one of the first set of batcher stands, and a second set of batcher pumps each of which is positioned in a respective one of the second set of batcher stands. Each batcher pump of the first and second sets of batcher pumps is in fluid communication with a respective one of the foam machines.

The foam machines can be either foam-in-bag machines, foam-in-place machines, or a combination of foam-in-bag machines and foam-in-place machines.

In another aspect, apparatus adapted to supply a foam machine with a foam precursor chemical is provided. The apparatus comprises a tote having a top opening and a bottom drain and containing a foam precursor chemical, a supply line connected to the bottom drain of the tote and in fluid communication with a batcher stand, and a batcher pump positioned in the batcher stand. The batcher pump is adapted to be in fluid communication with the foam machine.

In another aspect, apparatus for manufacturing foam cushions is provided. The apparatus comprises a foam machine, a tote having a top opening and a bottom drain and containing a foam precursor chemical, a supply line connected to the bottom drain of the tote and in fluid communication with a batcher stand, and a batcher pump positioned in the batcher stand. The batcher pump is in fluid communication with the foam machine.

In another aspect, a method of supplying a foam precursor chemical from a container to a pump of a foam machine is provided. The method comprises the steps of providing a container having a top opening and a bottom drain, providing an upstanding cylindrical tube having a closed bottom and an open top, connecting a supply line to the bottom drain of the container and to the cylindrical tube near a bottom of the cylindrical tube such that an interior of the cylindrical tube and the container are in fluid communication, and inserting a pump into the open top of the cylindrical tube.

The accompanying drawings, which are incorporated in and constitute a part of this specification, illustrate embodiments of the invention and, together with the summary of the invention given above, and the detailed description of the drawings given below, serve to explain the principles of the present invention.

DETAILED DESCRIPTION OF THE DRAWINGS

Figure 1:
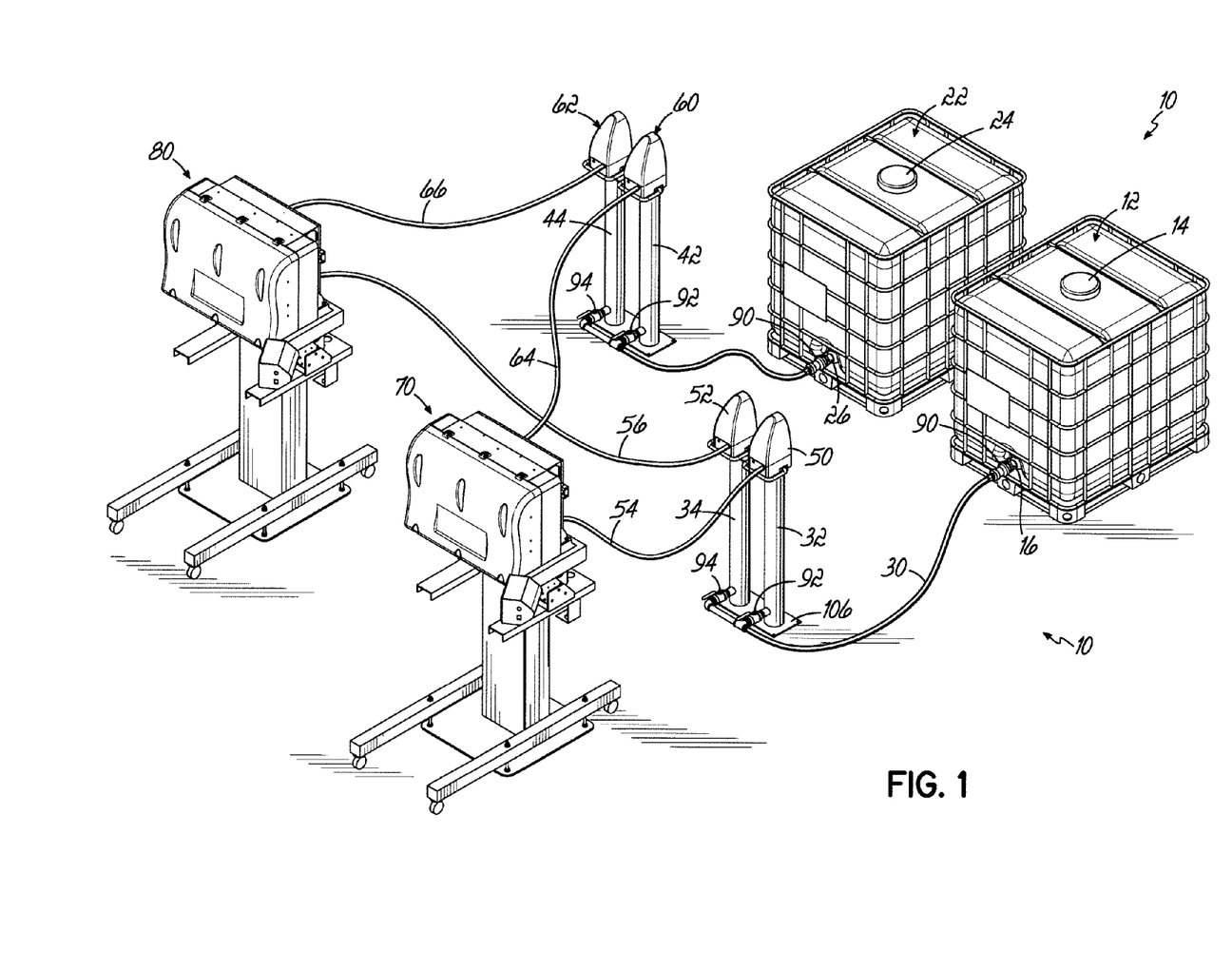
FIG. 1 is a perspective view of one embodiment of the apparatus of the present invention.

Referring first to FIG. 1, there is illustrated an exemplary embodiment of apparatus 10 for manufacturing foam cushions. In the exemplary embodiment, two foam machines are illustrated. However, the invention can be practiced with more than two foam machines, as well as with a single foam machine.

More particularly, in the illustrated exemplary embodiment, the apparatus 10 includes a first tote 12 having a top opening closable with a cap 14 and a bottom drain 16 and containing a first foam precursor chemical, and a second tote 22 having a top opening closable with a cap 24 and a bottom drain 26 and containing a second foam precursor chemical. The totes 12 and 22 can be of the 275 gallon variety described above, or any other volume. Accordingly, as used herein, the term "tote" shall not be limited to a 275 gallon container but shall embrace containers of other volumes. A first supply line 30 is connected to the bottom drain 16 of the first tote 12 and is in fluid communication with a first pair of batcher stands 32, 34. A second supply line 40 is connected to the bottom drain 26 of the second tote 22 and is in fluid communication with a second pair of batcher stands 42, 44. Each of a first pair of batcher pumps 50, 52 is positioned in a respective one of the first pair of batcher stands 32, 34. Each of a second pair of batcher pumps 60, 62 is positioned in a respective one of the second pair of batcher stands 42, 44. Batcher pumps 50, 60 are in fluid communication with a first foam machine 70 via supply lines 54, 64, respectively. Batcher pumps 52, 62 are in fluid communication with a second foam machine 80 via supply lines 56, 66, respectively. First and second foam machines 70, 80, as illustrated, are STOROpack® FOAMplus® BAGPACKER machines. Machines 70, 80 could also be STOROpack® FOAMplus® HANDPACKER machines. Machines 70, 80 could also be of the type described in the assignee's US Patent Publication No. 2010/0230032, provided they are modified for use with drum pumps or batcher pumps (as described in the '032 publication, the precursors are supplied to the machine via in-line pumps that pull the chemicals through hoses from the bottom drains of the drums/totes into the hoses feeding the machine). For that matter, machines 70, 80 could be any foam machine, whether of the foam-in-bag type or the foam-in-place type, the precursors for which are supplied by drum pumps or batcher pumps. Accordingly, as used herein, the term "foam machine" shall be deemed to generically embrace both foam-in-bag machines as well as foam-in-place machines.

Figure 2:
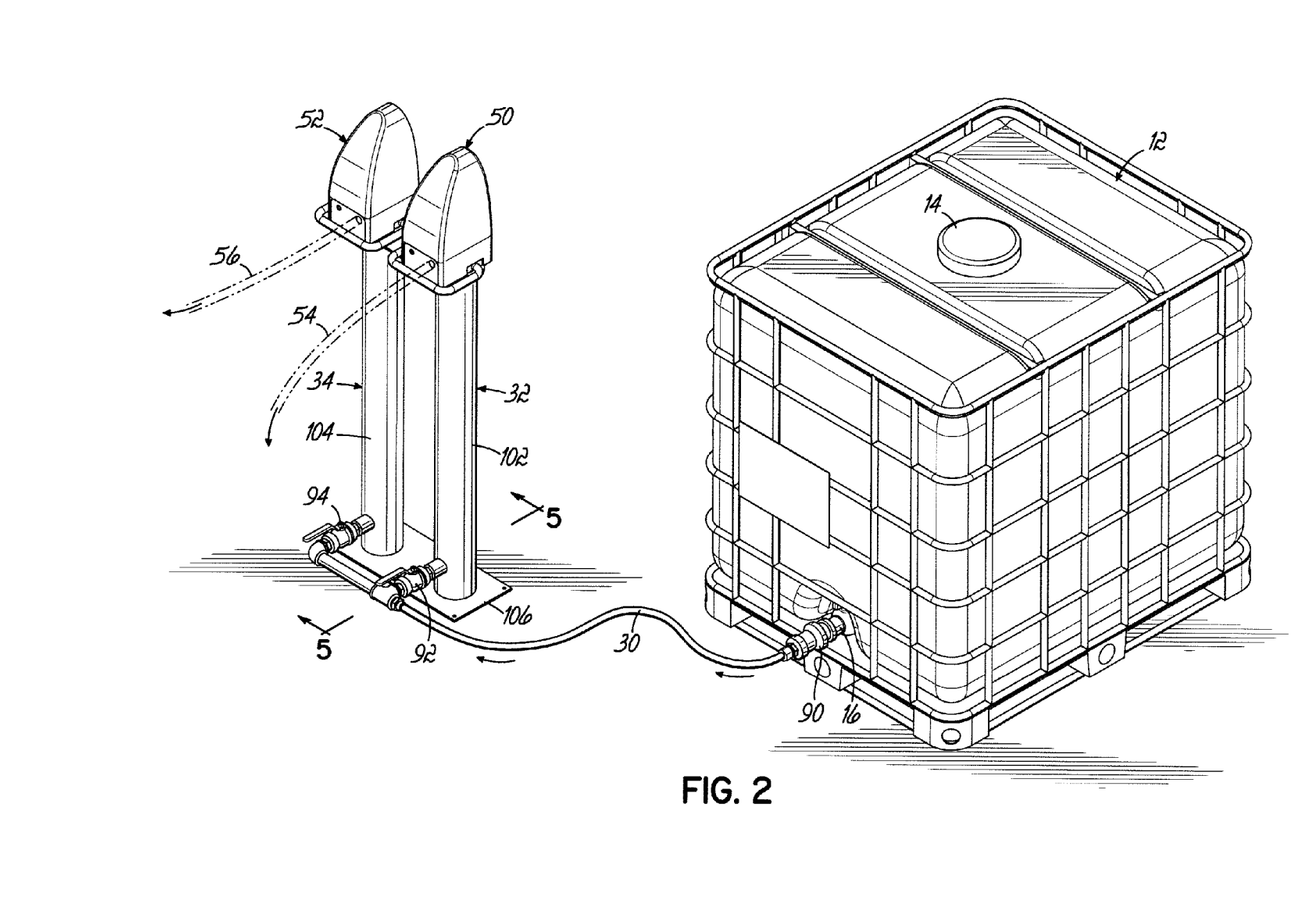
FIG. 2 is a perspective view of one tote and two batcher stands and pumps.
Figure 3:
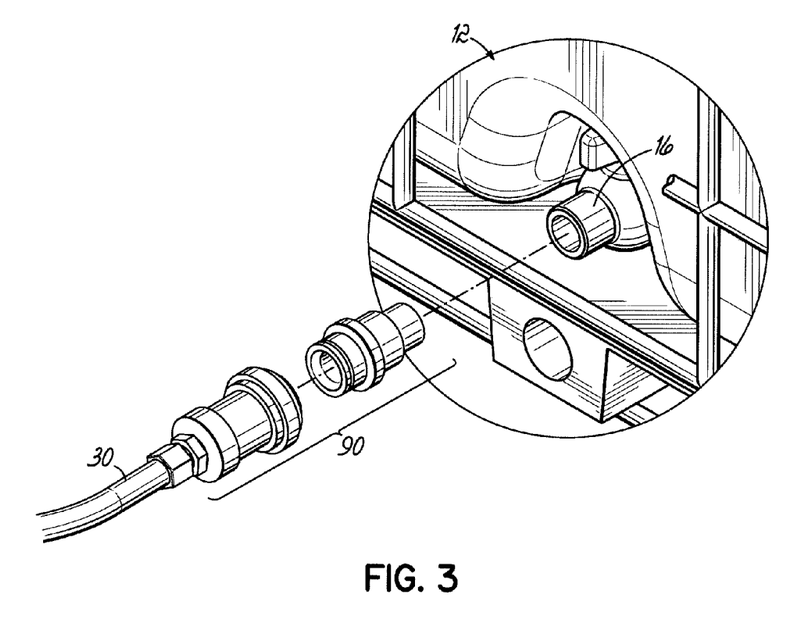
FIG. 3 is a perspective view of the tote drain port, quick connect fitting, and supply line.

Referring to FIGS. 2 and 3, one half of the apparatus 10 will be further described, with the understanding that the other half of the apparatus 10 is substantially the same. A quick connect coupling 90 can be used to quickly connect and disconnect supply line 30 to and from bottom drain 16. Valves 92, 94 can be used to selectively permit or prevent chemical from entering batcher stands 32, 34, respectively.

Figure 4:
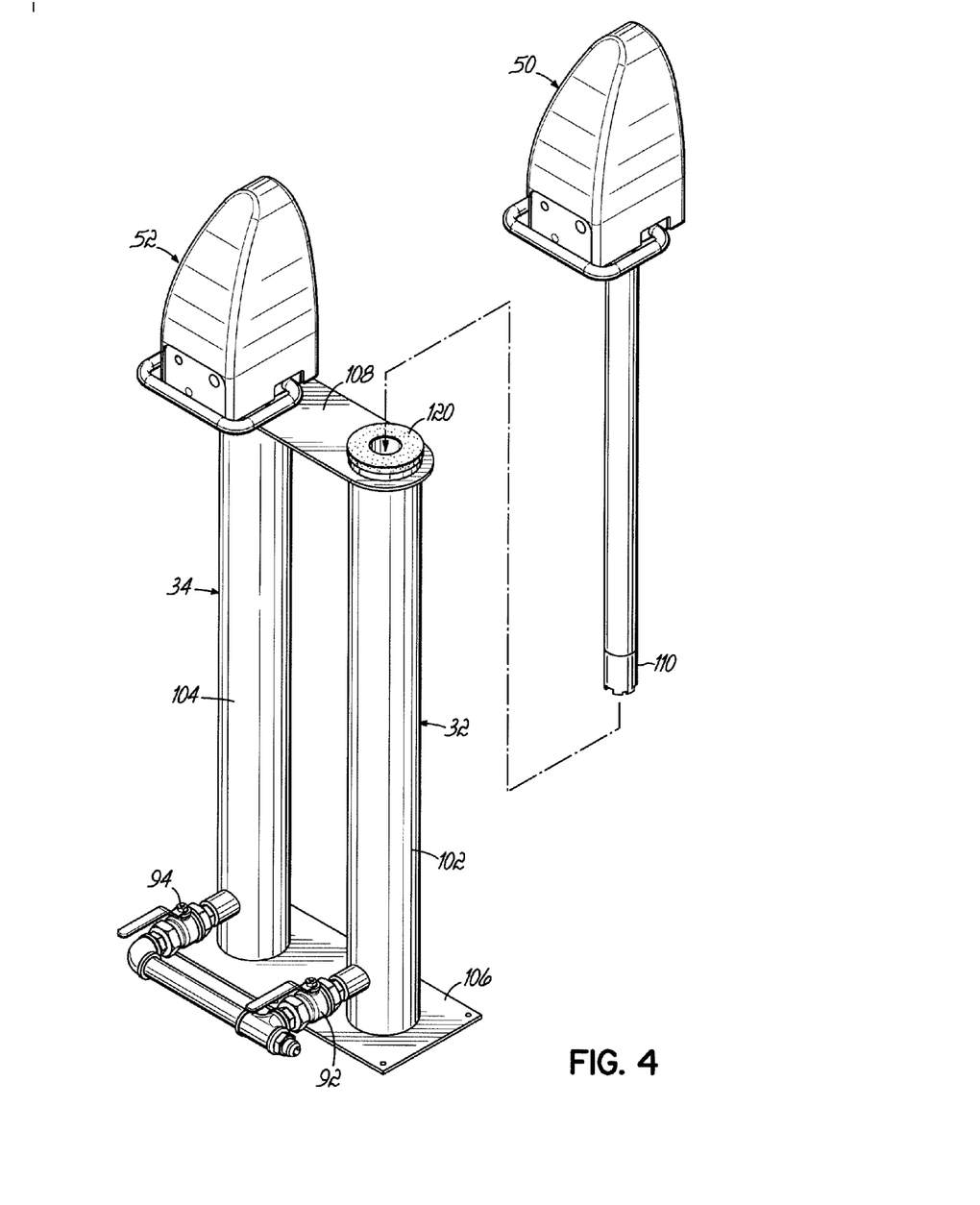
FIG. 4 is a perspective view of two batcher stands and pumps.
Figure 5:
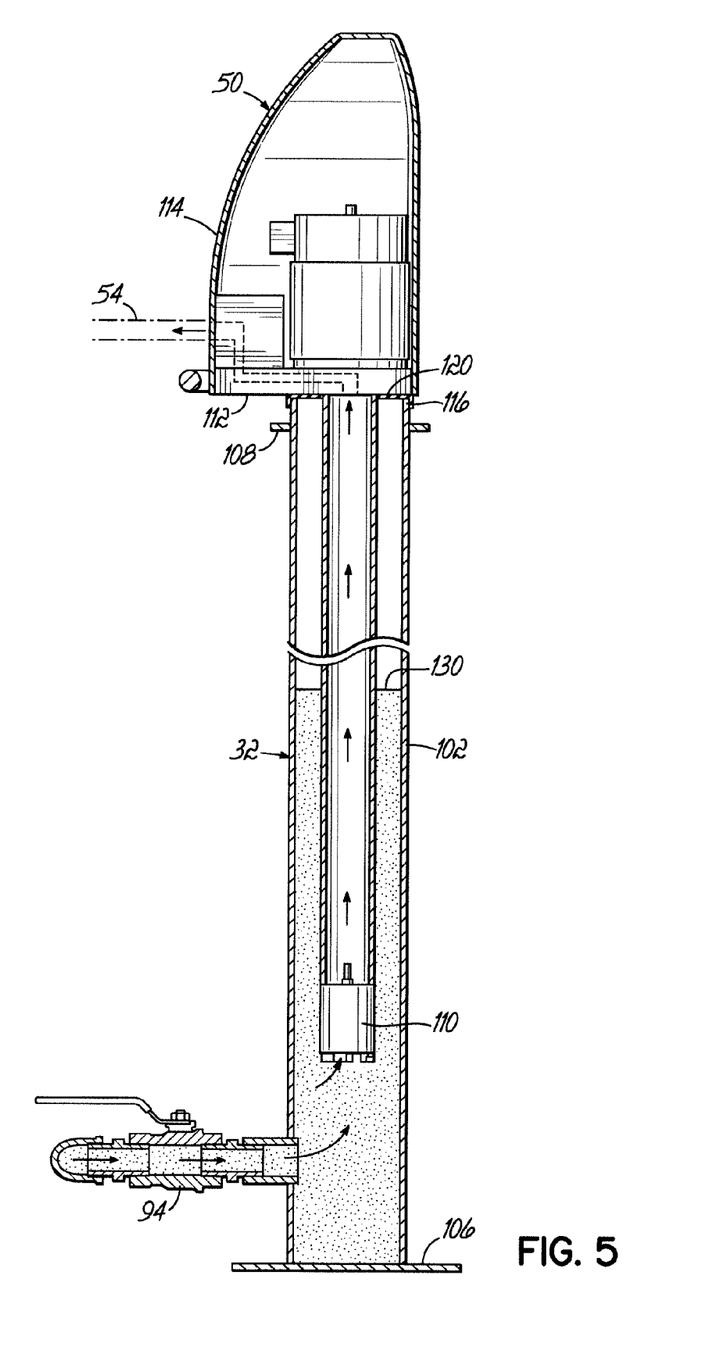
FIG. 5 is a side cross-sectional view of a batcher stand and pump.

Referring to FIGS. 4 and 5, it will be seen that batcher stands 32, 34 can be upright cylindrical tubes 102, 104. These upright cylindrical tubes 102, 104 can have a common base plate 106 as well as an interconnecting top plate 108 to provide stability to the tubes 102, 104 with batcher pumps 50, 52 installed. The suction end 110 of the batcher pump 50 is inserted down into the cylindrical tube 104 of batcher stand 34. The lower surface 112 of pump head 114 of batcher pump 50 can rest atop the top edge 116 of the cylindrical tube 104. The batcher pump 50 can be sealed to the batcher stand 34 via a seal or gasket 120 and desiccant dryers (not shown) can then be utilized to avoid damage to hydroscopic components being exposed to humid air. Provided valve 94 is open, foam precursor chemical will enter into cylinder 104 and rise upwardly to a level 130 (same level of chemical in tote), and can thereby be drawn upwardly by suction end 110 of batcher pump 50 and expelled into supply line 54 to foam machine 70.

Figure 6:
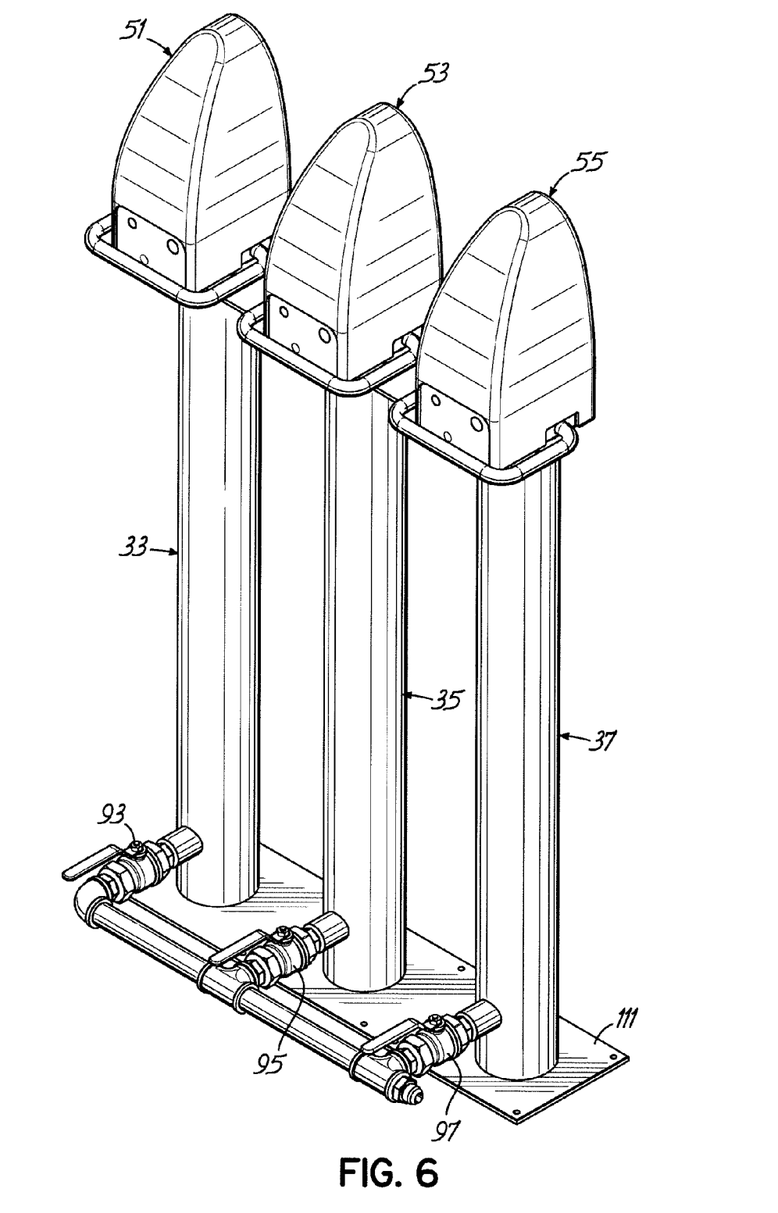
FIG. 6 is a perspective view three batcher stands and pumps.
Figure 7:
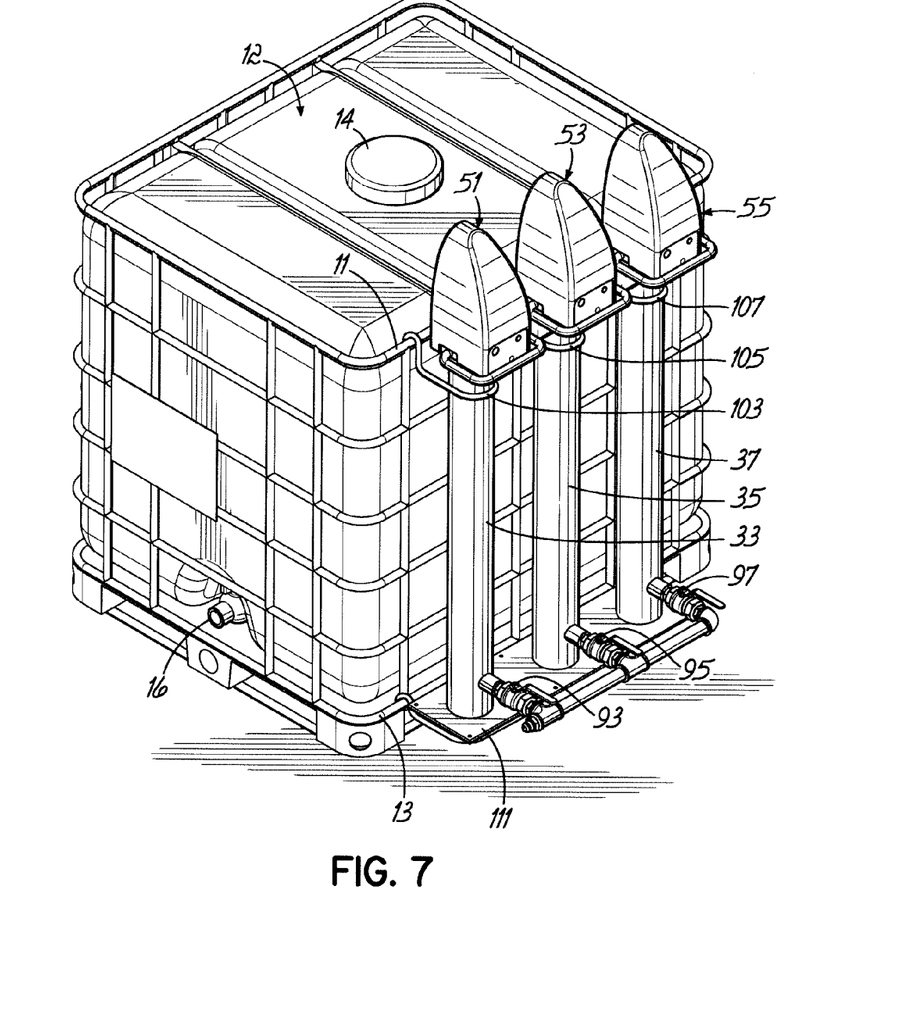
FIG. 7 is a perspective view of an alternative embodiment of the present invention.

According to the above then, multiple batcher stands, with or without a common base, with respective batcher pumps therein can be placed remote from the totes. Alternatively, the batcher stands could be configured to hang on the side of a tote, rather than being remote therefrom. For example, and referring now to FIGS. 6 and 7, three batcher stands 33, 35, 37, with valves 93, 95, 97, respectively, are illustrated containing batcher pumps 51, 53, 55. The batcher stands 33, 35, 37 can be hung from upper tote reinforcing structure 11 via hangers 103, 105, 107, respectively, and can be further supported from lower tote reinforcing structure 13 by hanger 109 upon which common batcher stand base plate 111 is supported.

One suitable tote/container for use with the present invention is a 275 gallon intermediate bulk container ("IBC") available from Hoover Container Solutions, Houston, Tex. One suitable batcher pump for use with the present invention is a T2 Transfer Pump available from Graco Inc., Minneapolis, Minn. One suitable quick connect coupling for use with the present invention is a Dry Poppet Quick Disconnect available from Banjo Corporation, Crawfordsville, Ind. One suitable valve for use with the batcher stands is a ball valve available from Parker Hannifin Corp., Cleveland, Ohio. The supply lines can be either flexible or rigid, and can be manufactured of plastic, metal, etc. The batcher stands can be fabricated of plastic, metal, etc.

The present invention provides a number of advantages. First, multiple foam machines are able to be readily supplied with one set of totes. Second, the batcher pumps are easily inserted into and removed from the batcher stands, unlike a single batcher pump which is awkwardly inserted into and removed from the top opening (bung) of a tote. Third, once installed, the batcher pumps may be left in the batcher stands during tote container changes, thereby completely eliminating the necessity of lifting, moving, or otherwise handling them at all, in contrast to using a single batcher pump installed through the top opening (bung) of a tote which must be handled during every tote change. In other words, once the batchers go into the batcher stands they essentially need not be touched again. Fourth, since additional holes do not have to be made in the top of the tote to accommodate multiple pumps, the totes may continue to be returned and recycled.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. The invention resides in each individual feature described herein, alone, and in all combinations of any and all of those features. Accordingly, the scope of the invention shall be limited only by the following claims and their equivalents.

What is claimed is:

1. A method of supplying a foam precursor chemical from a container to a pump of a foam machine, comprising the steps of:

providing a container having a top opening and a bottom drain, providing an upstanding cylindrical tube having a closed bottom and an open top, connecting a supply line to the bottom drain of the container and to the cylindrical tube near a bottom of the cylindrical tube such that an interior of the cylindrical tube and the container are in fluid communication, and inserting a pump into the open top of the cylindrical tube.

\* \* \* \* \*